H. B. KEIPER.
SEPARABLE RIM.
APPLICATION FILED AUG. 30, 1911.
1,097,444.
Patented May 19, 1914.
3 SHEETS—SHEET 1.
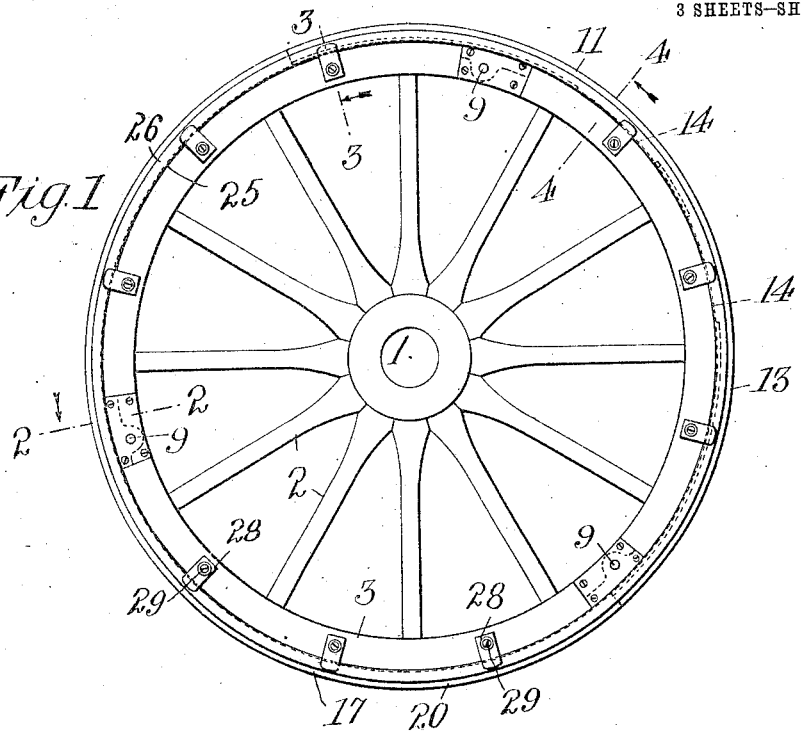
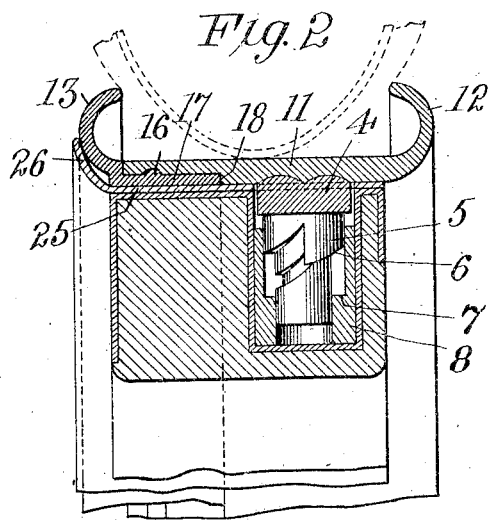
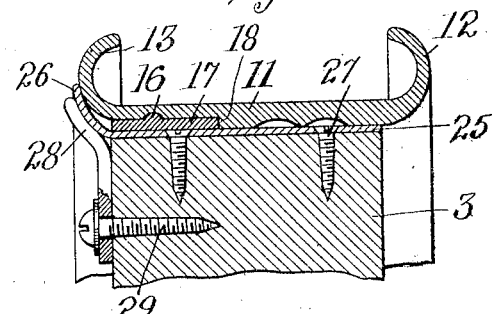
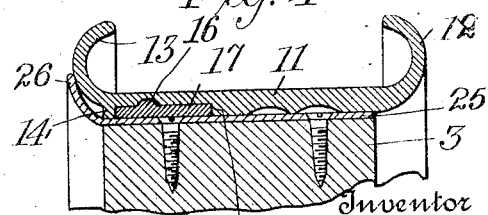
Witnesses
Joseph C. Stack
R. W. Bishop
Inventor
Henry B. Keiper
By Julius C. Dowell
his Attorney

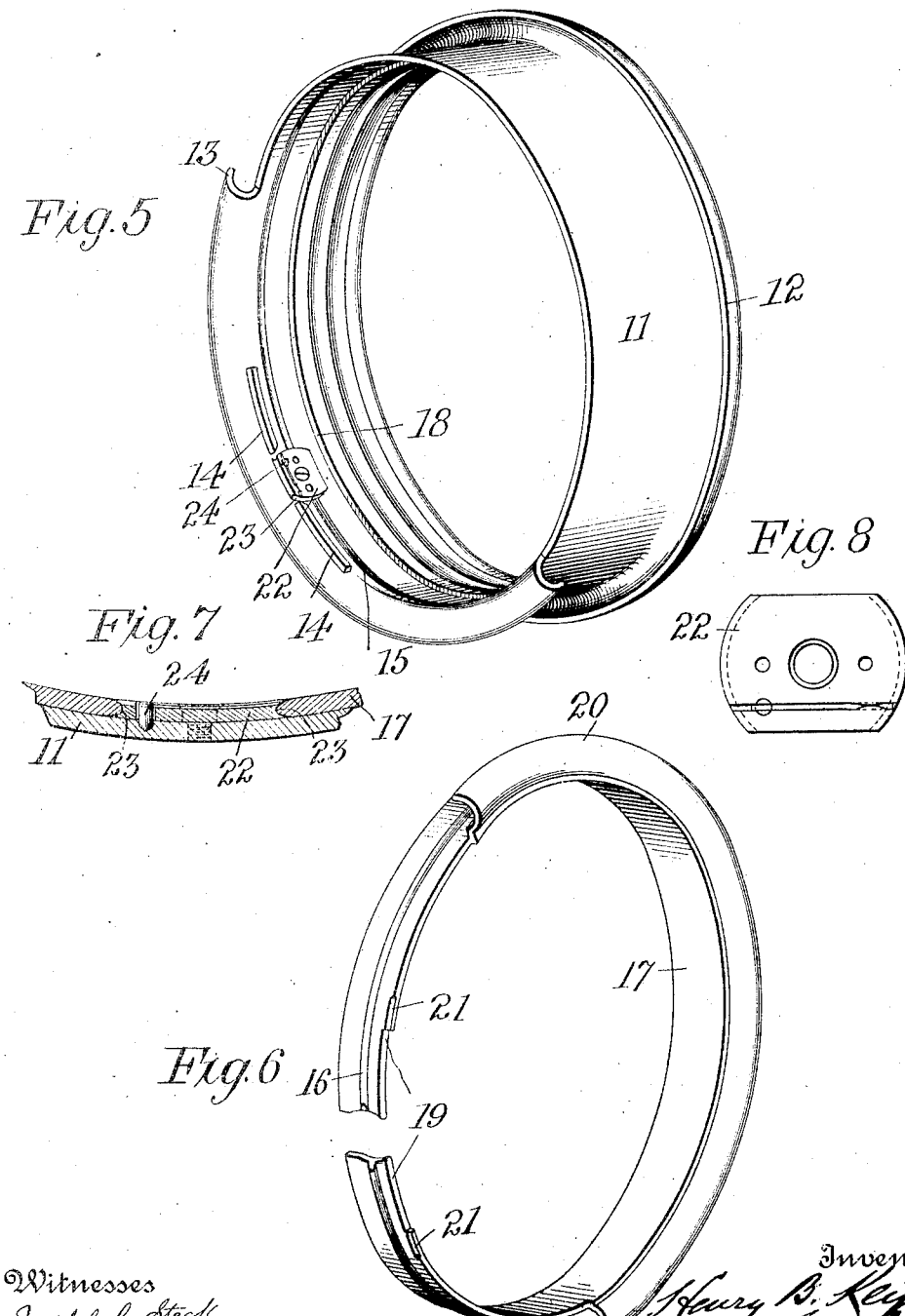

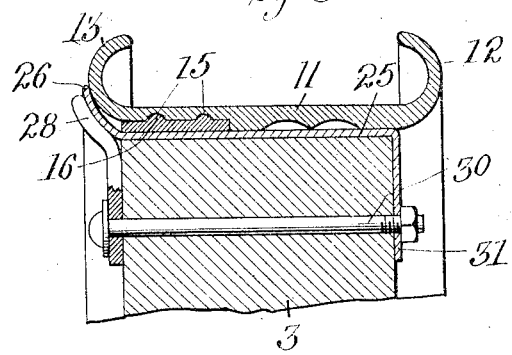
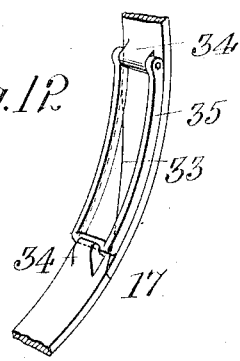
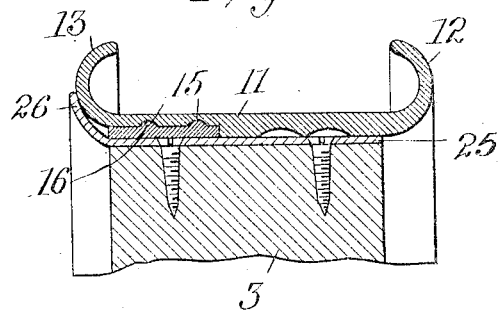
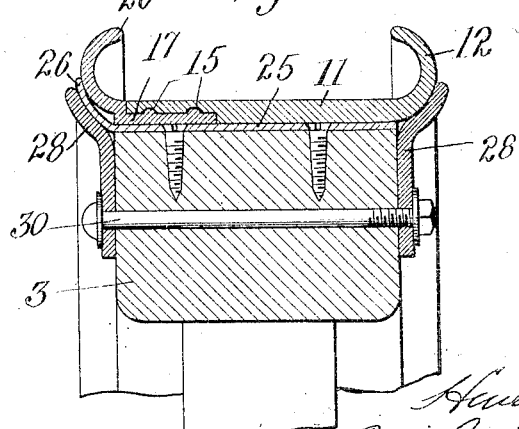

UNITED STATES PATENT OFFICE.

HENRY BRINSER KEIPER, OF LANCASTER, PENNSYLVANIA.

SEPARABLE RIM.

1,097,444.  Specification of Letters Patent.  Patented May 19, 1914.

Application filed August 30, 1911. Serial No. 646,950.

*To all whom it may concern:*

Be it known that I, HENRY B. KEIPER, a citizen of the United States, residing at Lancaster, in the county of Lancaster and State of Pennsylvania, have invented certain new and useful Improvements in Separable Rims, of which the following is a specification.

The object of this invention, generally stated, is to provide a rim for the support of pneumatic or cushion tires which will be so constructed that the tire will be effectually held in place when in use but may be easily and quickly detached when it is to be repaired.

The invention also has for its object the provision of a rim composed of separable members but presenting a continuous unbroken surface for contact with the inner circumference of the tire.

The invention also seeks to minimize the parts necessary to form a complete rim, to simplify the general construction and to lessen the labor of removing or applying the tire.

The objects of the invention are attained in the use of such a device as is illustrated in the accompanying drawings and hereinafter fully described, the novel features of the invention being pointed out in the claims at the end of the description.

In the annexed drawings, Figure 1 is a side elevation of a wheel equipped with my improved rim, the tire being omitted. Fig. 2 is an enlarged transverse section on the line 2—2 of Fig. 1, a portion of the tire being shown in dotted lines. Fig. 3 is a similar view on the line 3—3 of Fig. 1. Fig. 4 is a similar view on the line 4—4 of Fig. 1. Fig. 5 is a detail perspective view of the outer or carrying member of the rim. Fig. 6 is a similar view of the inner or locking member. Fig. 7 is a detail longitudinal section of the latch or locking button. Fig. 8 is an enlarged detail plan view of the latch. Figs. 9, 10 and 11 are enlarged transverse sections showing different forms of the rim and variations in the application of the same to the felly. Fig. 12 is a detail perspective view of an alternate form of latch. Fig. 13 is a detail sectional view of the end of the latch shown in Fig. 12.

The hub 1, the spokes 2, and the felly 3 may be of the usual or any preferred construction. At intervals around the felly are rim-securing devices which may be of any desired form although I prefer to use, and in Figs. 1 and 2 have illustrated, a device comprising a shoe 4 having a pin 5 disposed radially within the felly. The pin 5 is constructed with inclined or cam shoulders 6 which ride upon similar shoulders 7 within a sleeve 8 which sleeve may be rotated by means of a transversely disposed shaft 9 and suitable intermediate gearing. When the sleeve is rotated, the shoe will be projected or withdrawn to secure or release the rim, and to effect a holding engagement with the rim the meeting surfaces of the shoe and rim are ribbed or corrugated.

The rim constructed in accordance with my present invention comprises an outer tire-carrying ring 11, the width of which is approximately equal to the width of the felly and the outer circumferential face of which is uninterrupted thereby providing a smooth continuous surface against which the tire may rest without any liability of injury through pinching. On one edge, the ring is provided with an overhanging tire-engaging flange 12 extending around its entire circumference while on its other edge is an overhanging tire-engaging flange 13 which is mutilated or extends around only a portion of its circumference. On its inner circumferential face, the ring is provided with inwardly projecting lugs or short ribs 14 which are preferably located adjacent the center of the flange 13 and the purpose of which will presently appear. The ring is also provided in its inner circumferential face with a stepped or cut out portion at the margin of the ring carrying the mutilated flange, and in this stepped portion there is formed a groove 15 adapted to be engaged by a rib or projection 16 on the tire-retaining or locking member which, in the illustrated form of the invention, consists of a divided or split spring ring or band 17. This ring 17 fits within the stepped portion of the outer ring 11 with one edge fitting against an internal annular shoulder 18 at the inner extremity of said stepped portion and the inner face of the inner or locking or retainer ring is smooth and flush with the inner circumferential face of the outer ring so that the rim may move easily into position over the periphery of the wheel. The ends of the inner ring are reduced or notched, as shown at 19, to fit behind the ribs 14 and against the ends thereof to prevent accidental separation of the rings. The inner or locking ring is also provided with a flange 20 along a portion of one edge of the ring adapted to fit against and between the ends of the flange 13 and form therewith a complete tire-engaging flange. Adjacent the notches or reduced portions 19, the inner ring is slightly beveled, as indicated at 21, so that the inner ring may be engaged by a screw-driver or other convenient tool to be freed from the outer ring when it is desired to repair the tire.

In order to expand the inner ring against the outer ring and lock it in the expanded position, I provide a latch which, in the preferred form, consists of a locking button 22 pivotally mounted on the inner circumference of the outer ring and having its edges grooved or beveled to engage the correspondingly shaped edges of the division in the inner ring, as shown at 23. A spring pin 24 is mounted in the button and yieldably engages a socket in the outer ring when the button is in locking position to prevent premature release thereof. Any convenient form of key may be utilized to turn the button to releasing position.

The operation of the rim will be readily understood. The tire is placed in position over the tire-carrying ring, the tire-retaining member is then locked in position, and the tire inflated. It will be observed that the flange 13 extends over only about one-half the circumference of the ring so that the tire may be easily placed over the ring as it is not necessary to stretch the tire in the manner required by the rims in common use. The tire-retaining member slips into the tire-carrying ring without bearing against the tire and cutting or pinching of the tire during the fitting and locking of the same to the rim is thereby avoided inasmuch as the tire is in position on the tire-carrying ring before the retaining member is inserted and the surface of the said ring throughout its circumference is equal in width to the width of the tire. The insertion of the locking or retaining member, therefore, causes no wear on the tire and it slips easily and naturally into engagement with the exposed portion of the clenching bead on the tire. During insertion, the inner ring is slightly compressed in order to clear the lugs 14 and permit the rib 16 to be brought into position to engage the groove 15. After the ring is inserted, it is permitted to expand and the button 22 is turned so as to fully expand and lock it against the outer ring. The stress placed upon the rim by the tire will thus be effectually resisted and the resistance will automatically increase as the strain increases.

I do not limit myself to any particular number of the grooves 15 and ribs 16 although one will ordinarily be sufficient. In Figs. 9, 10 and 11, I have shown modified forms of the invention in which two of such ribs and grooves are employed.

In order to prevent the rim being pushed too far over the wheel, I prefer to employ a felly band 25 which extends over the entire periphery of the wheel and is formed with openings at intervals to accommodate the rim-securing devices. The edge of this band nearer the vehicle is turned radially outward to form a stop flange 26 against which the rim will impinge so that the movement thereof laterally over the wheel will be arrested. The band is secured upon the felly ordinarily by screws 27 inserted radially therethrough into the felly and to brace and support the stop flange 26 I secure clips or brackets 28 to the side of the felly in position to bear against said flange as shown, the clips being preferably secured in place by screws 29.

In Fig. 9, I have shown the clip 28 secured by a bolt 30 which extends entirely through the felly, and the felly band, in this instance, is provided with an inwardly extending flange 31 bearing against the outer side of the felly and secured thereto by the said bolt 30. The screws 29 are thus dispensed with and a single series of fastenings utilized to secure both the clips and the felly band.

In Fig. 10, I have shown a rim of the same form as that shown in Fig. 9 but with the felly band secured by radial screws as in Fig. 3.

Fig. 11 shows the manner of securing the rim to an ordinary felly. The inner face of the rim bears directly against the felly band and the corrugations to engage the shoe shown in Fig. 2 are omitted. The felly band is secured to the felly in any preferred manner and to prevent the rim slipping off the felly, the clips 28 are duplicated on the two sides of the felly and secured by bolts extending through the same.

The form of latch shown in Fig. 12 may be preferred sometimes to the button 22. In this arrangement, the division in the inner or retaining ring or band is an oblique slit 33 so that the ends of the band will overlap and tend to support each other and beyond but adjacent the ends of the slit transverse lugs 34 are provided on the inner face of the band. A bail or lever 35 is pivoted at one end in one of the lugs so that it may extend across the slit and bear against the other lug to thereby expand the ring as will be readily understood.

Having described my invention, what I claim as new and desire to secure by Letters Patent is:

1. A wheel rim comprising an outer tire-carrying ring provided at one edge with a tire-engaging flange extending entirely around its circumference and at its opposite edge with a tire engaging flange extending only partly around its circumference and having inwardly projecting lugs on its inner circumferential face, and a divided retainer ring fitting within the outer ring and having reduced portions engaging the said inwardly projecting lugs, the said inner ring being further provided along a portion of one edge with a tire engaging flange adapted to fit between the ends of the last mentioned flange of the outer ring.

2. A wheel rim comprising a tire-carrying ring having a stepped inner circumferential face and a groove in the stepped portion of said face, and a divided retainer ring fitting within the stepped portion of the tire-carrying ring and provided with a projection inter-engaging with the groove therein, the inner circumferential face of the retainer ring being flush with the unstepped portion of the inner circumferential face of the tire-carrying ring, together with means for engaging the ends of the divided ring and expanding the same into locking engagement with the tire-carrying ring.

3. A wheel rim comprising a tire-carrying ring having a stepped inner circumferential face and a groove in the stepped portion of said face, and a retainer ring fitting within the stepped portion of the tire-carrying ring and provided with a projection inter-engaging with the groove therein, the inner circumferential face of the retainer ring being flush with the unstepped portion of the inner circumferential face of the tire-carrying ring.

4. The combination with a tire-carrying ring, of a divided retainer ring fitting within said tire-carrying ring, inter-engaging means on the contacting faces of the rings, and a pivoted latch carried upon the inner face of the tire-carrying ring for engaging the ends of the retainer ring and expanding said retainer ring into interlocking engagement with the tire-carrying ring, substantially as described.

5. A wheel rim comprising a tire-carrying outer ring, a divided inner ring fitting within the tire-carrying ring and having a tire-retaining portion, and a pivoted latch adapted to engage the ends of the divided ring and expand the same into locking engagement with the tire-carrying ring.

6. A wheel rim comprising a tire-carrying outer ring, a divided inner ring fitting within the tire-carrying ring and having a tire-retaining portion, and a button pivoted on the inner circumference of the outer ring within the divided portion of the inner ring to expand the inner ring within and against the outer ring.

7. A wheel rim comprising a tire-carrying outer ring, a divided inner ring fitting within the tire-carrying ring and having a tire-retaining portion, a button pivoted on the inner circumference of the outer ring within the divided portion of the inner ring to expand the inner ring within and against the outer ring, and a locking pin mounted on the button and yieldably engaging the outer ring.

8. A wheel rim comprising an outer tire-carrying ring provided at one edge with a tire-engaging flange extending entirely around its circumference and at its opposite edge with a tire-engaging flange extending only partly around its circumference, and having inwardly projecting lugs between the ends of said last-mentioned flange, and an inner spring ring fitting within the outer ring and having reduced portions engaging the said inwardly projecting lugs, the said inner ring being further provided along a portion of one edge with a tire-engaging flange adapted to fit between and against the ends of the last-mentioned flange of the outer ring.

9. A wheel rim comprising a tire-carrying ring provided at one edge with a tire-engaging flange extending entirely around its circumference and at its opposite edge with a tire-engaging flange extending only partly around its circumference, a divided retainer ring fitting within the tire-carrying ring and provided along a portion of one edge with a tire-engaging flange adapted to fit between the ends of the last mentioned flange on the tire-carrying ring, and a pivoted latch carried by the tire-carrying ring adapted to engage the ends of the divided retainer ring for locking said rings together.

10. A wheel rim comprising a tire-carrying ring having inwardly projecting lugs on its inner circumferential face, a split retainer ring fitting within the tire-carrying ring and having reduced portions at its ends for engaging said lugs, and means carried by the tire-carrying ring for locking said reduced portions in engagement with said lugs.

11. The combination with a tire-carrying ring having a plurality of lugs upon its inner circumferential face, of a divided retainer ring fitting within said tire-carrying ring and having reduced portions at its ends adapted to engage said lugs and a pivoted latch carried by the tire-carrying ring for expanding said retainer ring and locking said reduced end portion thereof into engagement with said lugs.

In testimony whereof I affix my signature, in presence of two witnesses.

HENRY BRINSER KEIPER.

Witnesses:
 CHAS. E. LONG,
 C. A. PROST.